E. F. CHAFFEE.
SHIELD FOR RAILWAY CAR VESTIBULE TRAP DOOR LOCKS.
APPLICATION FILED AUG. 10, 1914.

1,115,394.  Patented Oct. 27, 1914.

Witnesses:

Inventor
Edward F. Chaffee
By his Attorneys
Parsons & Bodell

UNITED STATES PATENT OFFICE.

EDWARD F. CHAFFEE, OF SYRACUSE, NEW YORK, ASSIGNOR TO THE O. M. EDWARDS COMPANY, INC., OF SYRACUSE, NEW YORK, A CORPORATION OF NEW YORK.

SHIELD FOR RAILWAY-CAR VESTIBULE-TRAP-DOOR LOCKS.

1,115,394.     Specification of Letters Patent.     Patented Oct. 27, 1914.

Application filed August 10, 1914. Serial No. 856,091.

*To all whom it may concern:*

Be it known that I, EDWARD F. CHAFFEE, a citizen of the United States, and a resident of Syracuse, in the county of Onondaga and State of New York, have invented a certain new and useful Shield for Railway-Car Vestibule-Trap-Door Locks, of which the following is a specification.

This invention relates to car vestibule trap doors and has for its object a particularly simple and efficient means by which the passengers' clothes are prevented from fouling on the operating member for the lock of the trap door; and it consists in the combinations and constructions hereinafter set forth and claimed.

In describing this invention, reference is had to the accompanying drawings, in which like characters designate corresponding parts in all the views.

Figure 1:
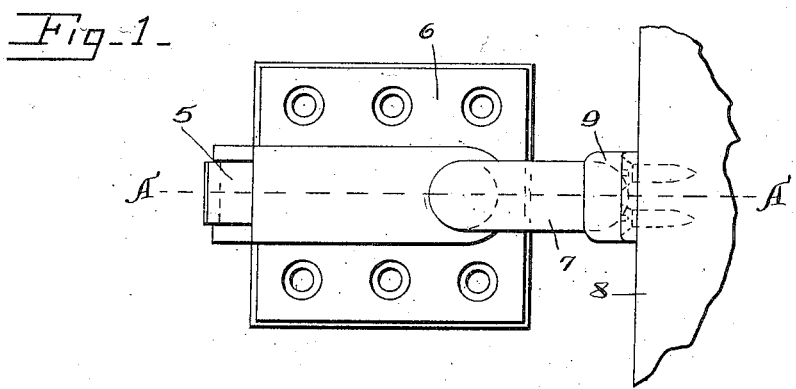
Figure 2:
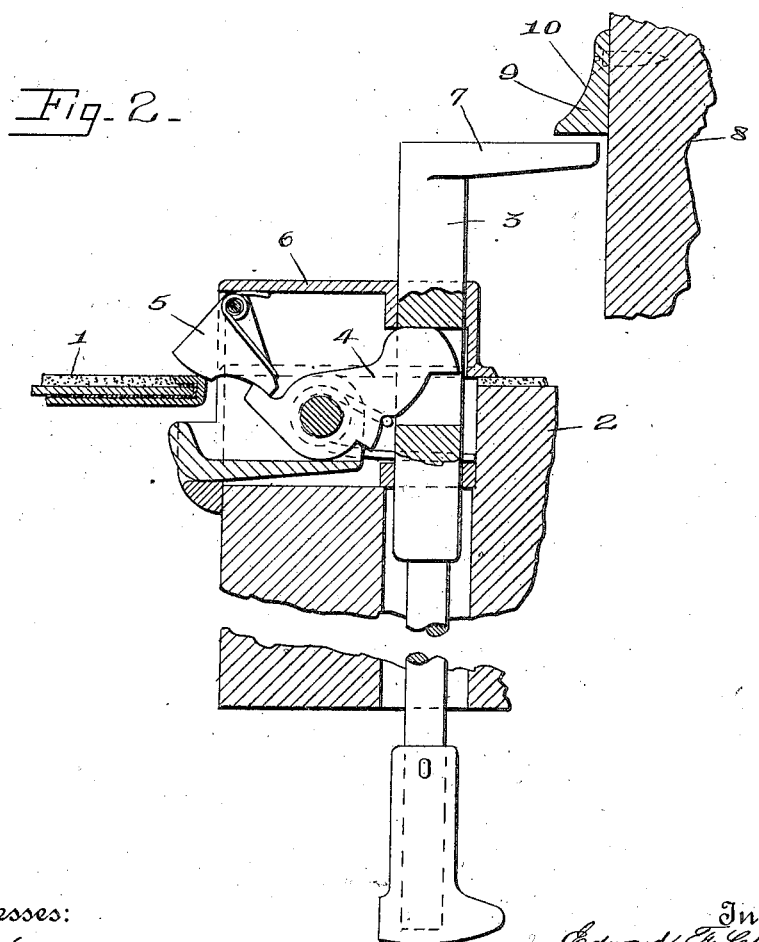

Figure 1 is a plan view of this trap door lock, the contiguous part of a car vestibule being also shown. Fig. 2 is a section, partly in elevation, on the plane of line A—A, Fig. 1, the contiguous part of the trap door being also shown.

1 designates the trap door which, as will be understood by those skilled in the art, is hinged to the vestibule in position to move into a horizontal position to cover the vestibule steps and into a vertical position to uncover the steps, the movement from closed to open position being effected by a spring, and the door being usually held from opening by a lock mounted on the platform end sill 2.

3 designates the movable operating member of the lock, said member being depressible or movable downwardly to operate a lever 4 which coacts with a pivoted latch 5 coacting with the trap door 1, the lever 4 and latch 5 being mounted within a suitable housing 6 suitably secured to the end sill 2. The mechanism of the lock forms no part of this invention.

The operating member is formed with a head at its upper end, and the edge of the head is covered by a stationary shield usually carried by an upright wall of the vestibule called the vestibule finish. The head is located entirely at one side of the operating member which is usually a vertical rod or shank, and as here shown, the head is an arm 7 extending laterally from the rod or shank and having its faces contiguous to the shank, flush with the faces of the shank so that where the head joins the shank there are no projections on which passengers' clothes might catch. The arm 7 terminates close to the upright wall or finish 8 of the vestibule.

9 is the shield secured to the finish 8 in any suitable manner, as by screws, the shield projecting far enough from the finish to cover the end edge portion of the arm 7, and the upper surface thereof being inclined downwardly and outwardly from the finish 8 as at 10 to facilitate the sliding of the trainman's foot along the shield in order to deflect it onto the head 7, so that the trainman's foot will not lodge on the shield.

The working of the operating member is the same as heretofore, that is, when it is desired to open the trap door 1, the trainman depresses the member 3 with his foot to operate the latch 5 to release the door 1, but heretofore the upper end of the operating member has been an unprotected projection on which passengers' clothes were liable to catch. By my invention, the head is in the form of a laterally extending arm 7, the end of which is located under the shield 9 so that it is impossible for passengers' clothes to hook over the head 7, and at the same time, the head is readily accessible to the trainman as the shield does not interfere with the operation of the member 3.

What I claim is:—

1. A railway car vestibule trap door lock comprising a movable operating member carried by a portion of the car and including a projecting portion located above the platform surface, and a stationary shield covering an edge portion of the operating member to prevent passengers' clothes from catching on the operating member, substantially as and for the purpose described.

2. A railway car vestibule trap door lock comprising an operating member carried by a portion of the car and including a vertical shank and a laterally extending head at its upper end terminating near a vertical wall of the vestibule, the side and end surfaces of the head near the shank of the operating member being flush with the shank, substantially as and for the purpose specified.

3. A railway car vestibule trap door lock comprising an operating member carried by the platform, and having a laterally extending head, and a stationary shield covering the outer end of said head to prevent passengers' clothes from fouling on the head, substantially as and for the purpose set forth.

4. A railway car vestibule trap door lock comprising a depressible operating member on the platform end sill, said member including a vertically movable shank and a laterally extending head at the upper end of the shank, the head extending laterally on one side of the shank and terminating near a side wall of the vestibule, and a shield carried by the side wall in position to cover the outer end of said arm, substantially as and for the purpose described.

5. A railway car vestibule trap door lock comprising an operating member carried by a portion of the car and including a vertical shank and a laterally extending head at its upper end terminating near a vertical wall of the vestibule, the side and end surfaces of the head near the shank of the operating member being flush with the shank, and a shield carried by said wall of the car in position to cover the outer end of said arm, substantially as and for the purpose specified.

6. A railway car vestibule trap door lock comprising a depressible operating member on the platform end sill, said member having a laterally extending head at its upper end and terminating near the side wall of the vestibule, and a shield carried by the side wall in position to cover the outer end of said arm, the shield having an inclined upper face which inclines downwardly and outwardly from said wall, substantially as and for the purpose set forth.

7. A railway car vestibule trap door lock comprising a movable operating member including a head located entirely at one side of the operating member, and a stationary shield covering the extremity of the head, substantially as and for the purpose described.

In testimony whereof, I have hereunto signed my name in the presence of two attesting witnesses, at Syracuse, in the county of Onondaga, in the State of New York, this 27th day of July, 1914.

EDWARD F. CHAFFEE.

Witnesses:
ARTHUR E. PARSONS,
S. DAVIS.